O. FULLER.
CULTIVATOR ATTACHMENT.
APPLICATION FILED JULY 15, 1919.
1,334,994.
Patented Mar. 30, 1920.
2 SHEETS—SHEET 1.
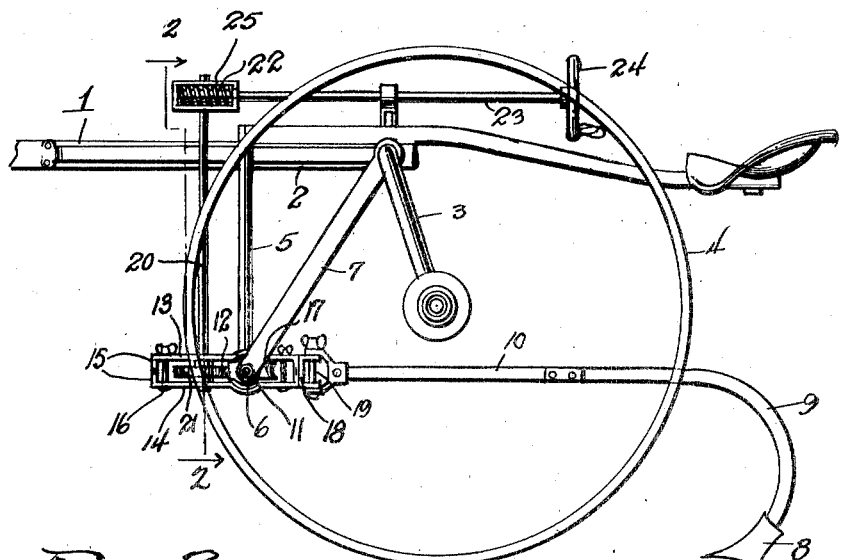
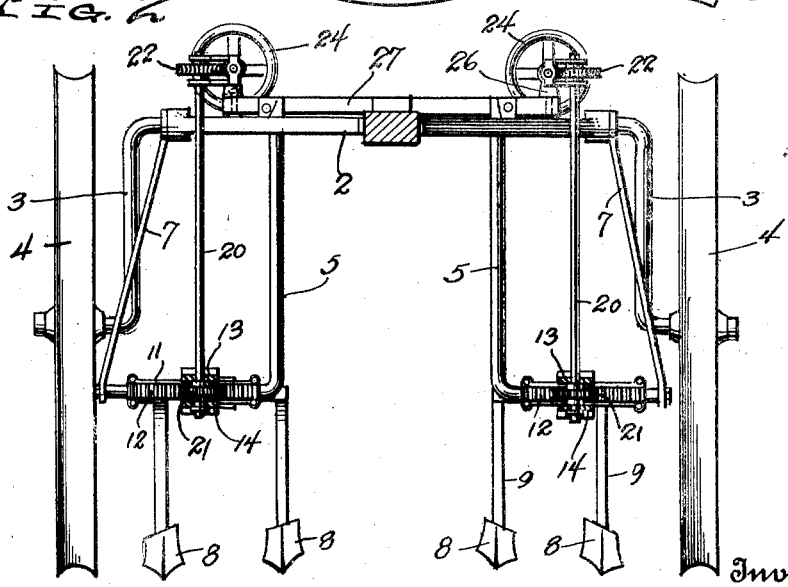

O. FULLER.
CULTIVATOR ATTACHMENT.
APPLICATION FILED JULY 15, 1919.
1,334,994.
Patented Mar. 30, 1920.
2 SHEETS—SHEET 2.
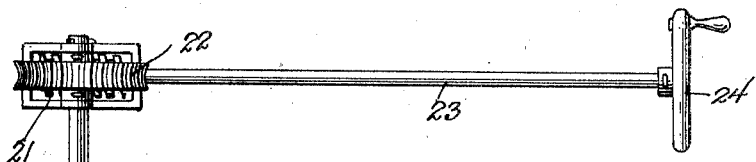
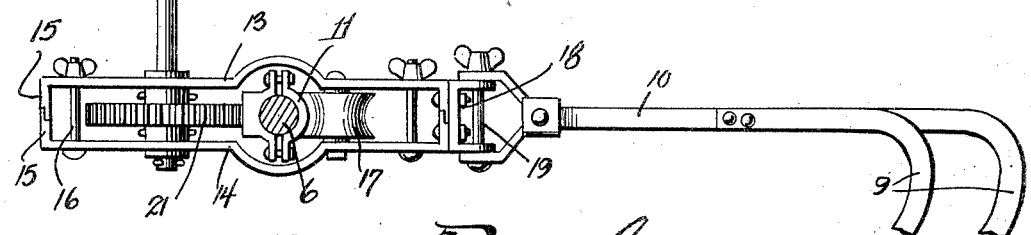
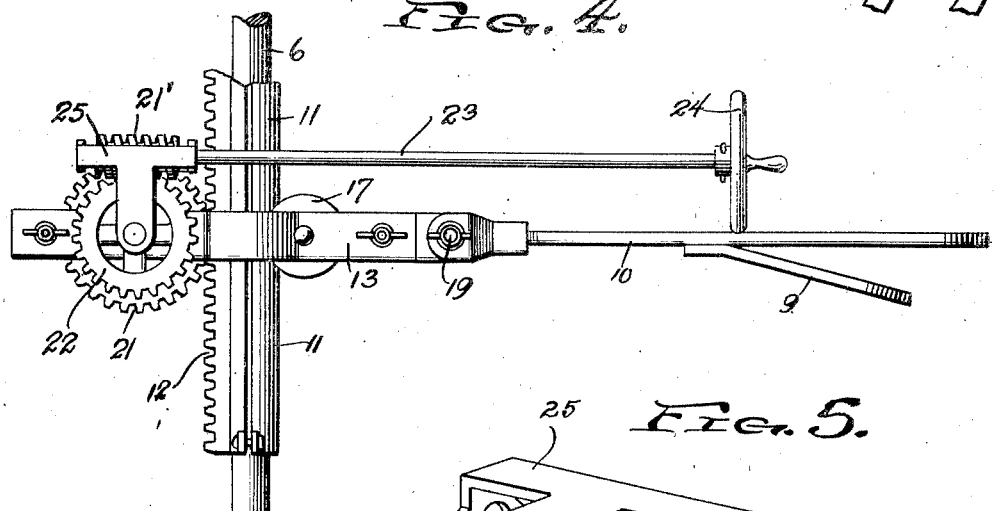
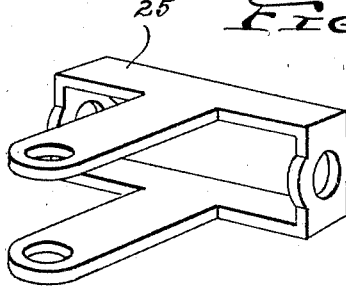
WITNESSES
INVENTOR.
Orton Fuller
BY
ATTORNEY.

UNITED STATES PATENT OFFICE.

ORTON FULLER, OF CHAUTAUQUA, KANSAS.

CULTIVATOR ATTACHMENT.

1,334,994.   Specification of Letters Patent.   Patented Mar. 30, 1920.

Application filed July 15, 1919. Serial No. 310,915.

*To all whom it may concern:*

Be it known that I, ORTON FULLER, a citizen of the United States, residing at Chautauqua, in the county of Chautauqua and State of Kansas, have invented certain new and useful Improvements in Cultivator Attachments, of which the following is a specification.

This invention relates to attachments for riding cultivators and more particularly to an apparatus which may be mounted upon a riding cultivator and connected to the cultivator beams so that the operator of the cultivator may shift the cultivator blades as desired.

The primary object of the invention is to provide an apparatus which may be conveniently operated for the purpose of laterally shifting the cultivator blades at opposite sides of the cultivator so that they may be disposed closer together, or farther apart during the cultivating operation.

The invention further aims to provide an apparatus of this character which may be easily mounted in position by simply removing a portion of the minor parts in the conventional form of cultivator and substituting the suitable mechanism for connecting the blade beam with the apparatus.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a side elevation, partly broken away, showing the invention applied to a riding cultivator.

Fig. 2 is a section taken approximately on the line 2—2 of Fig. 1.

Fig. 3 is an enlarged view of a portion of the apparatus detached.

Fig. 4 is a plan view of the same.

Fig. 5 is a perspective view of a bracket used in mounting the structure in position.

Referring to the drawing wherein is illustrated the preferred form of my invention, in which like numerals of reference indicate like or corresponding parts throughout the several views, the main frame 1 of the cultivator is provided with an arched axle 2 the ends 3 of which are equipped at their lower ends with laterally projecting pintles upon which the supporting wheels 4 are mounted. The frame is also provided with vertical supports 5 laterally spaced apart and having outwardly turned horizontal shafts 6. The end of each shaft 6 is supported by a hanger 7 joined to the shaft and hung from the cultivator frame.

As is usual in cultivators of this type, the cultivator blades 8 are arranged in separate gangs and each blade is secured to a standard 9, the standards in each gang having a common draft bar 10 which projects forwardly toward one of the shafts 6. Mounted on the shaft is a sleeve 11 which comprises separate sections bolted together as shown to advantage in Fig. 3 and one of the sections is provided with teeth 12 forming a rack bar extending lengthwise of the sleeve and which may be of any desired length. A frame for supporting the gearing and for connection with the draft bar 10 comprises the upper frame plates 13 and the lower frame plates 14, the two plates having right angularly extended portions 15 which interlock as shown and these portions are held in position by the fastening bolts 16 which maintain the frame plates in assembled relation and which embrace the sleeve 11. A roller 17 carried by the frame engages one side of the sleeve and is adapted to travel thereover. The forwardly projecting end of the draft bar 10 for the cultivator blade is connected by means of a coupling member 18 to the adjacent end of the frame plates 13 and 14, the coupling including a pintle or pivot member 19 connected to the complementary coupling member which is joined to the draft bar so that swinging movement in a lateral plane of the cultivator bars will be permitted.

Extending upwardly from the forward portion of the frame is a standard 20 having its lower ends journaled in the frame and equipped with a spur gear 21 having its teeth in mesh with the rack bar 12. The upper end of the standard or shaft 20 is provided with a worm gear 22 in mesh with a horizontally disposed worm 21' which is joined to a shaft or rod 23 projecting toward the operator's seat which is suspended from the cultivator frame. This end of the rod 23 is equipped with a hand wheel 24 by which the rod may be turned. A boxing 25 is mounted to support the worm gear and worm and this boxing has a support 26 adapted to travel through a trackway 27 mounted upon the frame of the cultivator.

It will be noted that the parts referred to are duplicated at each side of the cultivator frame, one set of gearing mechanism being adapted for each gang of cultivator blades, so that the latter may be operated independently by the operator of the cultivator. By turning the hand wheel, the rod 23 will be actuated to turn the worm 21' whereby the worm gear 22 may be turned for imparting rotary movement to the upright shaft 20 thus turning the spur gear 21, which in turn, engages the teeth of the rack bar and causes the gear 21 to travel along the rack bar and move the frame plates 13 and 14 horizontally thus changing the lateral position of the cultivator blades and moving them either toward or away from the adjacent wheels whereby the space between the gangs may be increased or diminished as desired.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. An apparatus of the character described, comprising in combination with a cultivator frame having separate gangs of cultivator blades equipped with draft bars, of horizontally disposed shafts provided with rack bars, gearing mechanism engageable with the rack bars and provided with supporting plates movable with the gearing mechanism, the said plates being connected to the draft bars for the cultivator blades to move the draft bars laterally when the said gearing mechanism is actuated.

2. An apparatus of the character described, comprising, combination with a cultivator having a supporting frame and draft bars for the cultivator blade, horizontal shafts suspended from the frame and equipped with rack bars, movable frame plates arranged in pairs and fastened together to embrace the rack bars, a gear engageable with the rack bar and disposed between the said plates, a manually operated shaft carrying the said gear and adapted to rotate the latter when the shaft is actuated, and means for connecting the said cultivator blade draft bars with the said frame plate.

3. An apparatus of the character described comprising, in combination with a cultivator frame equipped with cultivator blades having draft bars arranged in separate gangs and connected to common draft bars, of a pair of horizontally disposed shafts suspended from the frame and held in spaced relation, a frame embracing each shaft, a rack bar mounted on each shaft, gearing mechanism supported in the frame and engageable with the rack bar to move the said frame laterally when the gearing mechanism is actuated, coupling means for connecting the draft bars with the said frame, and means to actuate the said gearing mechanism.

In testimony whereof I affix my signature in presence of two witnesses.

ORTON FULLER.

Witnesses:
H. B. FAIRLEY,
R. A. BURNS.